United States Patent
Abramowski et al.

[11] Patent Number: 5,581,601
[45] Date of Patent: Dec. 3, 1996

[54] COMMUNICATION SYSTEM

[75] Inventors: Stephan Abramowski; Axel Kehne; Karin Klabunde; Ursula Konrads, all of Aachen, Germany

[73] Assignee: U.S. Philips Corporation, New York, N.Y.

[21] Appl. No.: 343,309

[22] Filed: Nov. 22, 1994

[30] Foreign Application Priority Data

Nov. 26, 1993 [DE] Germany .......................... 43 40 326.3

[51] Int. Cl.$^6$ .............................. H04M 11/00; H04M 3/42
[52] U.S. Cl. .................................. 379/67; 379/88; 379/89; 379/211; 379/212; 379/207
[58] Field of Search ..................... 379/210, 211, 379/212, 201, 67, 88, 89, 209, 213, 214, 205, 207

[56] References Cited

U.S. PATENT DOCUMENTS

| | | | |
|---|---|---|---|
| 5,272,748 | 12/1993 | Davis | 379/222 |
| 5,384,831 | 1/1995 | Creswell et al. | 379/211 |
| 5,392,340 | 2/1995 | Otsuka | 379/211 |
| 5,394,463 | 2/1995 | Fischell et al. | 379/201 |
| 5,408,528 | 4/1995 | Carlson et al. | 379/211 |
| 5,440,541 | 8/1995 | Lida et al. | 379/211 |
| 5,440,620 | 8/1995 | Slusky | 379/211 |
| 5,442,689 | 9/1995 | Buttitta et al. | 379/211 |
| 5,469,501 | 11/1995 | Otsuka | 379/211 |

FOREIGN PATENT DOCUMENTS 9211724   7/1992   WIPO .

OTHER PUBLICATIONS

IEEE Global Telecommunications Conference & Exhibition, Bd. 2, Nov. 28, 1988, "Operations Technology Impacts of Potential New Network Capabilities", by Renee M. Goldaper, pp. 1039–1043.

W. Krusch et al, "Neue Dienste im intelligenten Telefonnetz", 1993, pp. 155–159.

Primary Examiner—Krista M. Zele
Assistant Examiner—Parag Dharia
Attorney, Agent, or Firm—David R. Treacy

[57]   ABSTRACT

A communication system comprising a controller (1) arranged for service implementation. The controller (1) is arranged for extracting a service logical program from a data bank (3) after the controller has received parameters transmitted by a terminal unit (6), and for activating a service in response to a service logical program and second parameters and, in response to a service logical program and first parameters, for providing a service for a subscriber and for transmitting at least one service parameter to the terminal unit (6, 8) and/or, in response to a service logical program and fourth parameters, for deleting a subscriber's authorization to use a service.

20 Claims, 2 Drawing Sheets

COMMUNICATION SYSTEM

BACKGROUND OF THE INVENTION

The invention relates to a communication system comprising a controller arranged for service implementation, which controller is coupled to a data bank and, via at least one switch, to at least one terminal unit.

Patent Application WO 92/11724 has disclosed a communication system which comprises a communication network (switched telephone network, service control point) comprising several switches and terminal units coupled to these switches. Certain switches included in the communication network are used, on the one hand, for carrying out switching functions with various terminal units (for example, telephone traffic) or further switches and, on the other hand, for switching to a network (overlay network) arranged for service implementation. One service of the German Post-Office Telekom is, for example, the private information service Tele-Info-Service.

If a subscriber dials a specific service number (for example, 0190 . . . ), a switch (service switching point) recognizes this and establishes a connection to this network arranged for service implementation. At least certain switches not only perform their normal call switching, but also process calls and switch them through to the service implementing network.

If a subscriber wishes to use a service (service subscription, service providing), the subscriber contacts the service operator and receives, for example, in written form, the data necessary for using the service (for example, identification number, registration number). The use of the service can also be cancelled, but only in written form. A subscriber, however, may effect a change of service parameters from his terminal unit. For example, a call diversion may be changed (compare "Neue Dienste im intelligenten Telefonnetz" by Wilhelm Krusch, R. v. Decker's Verlag, G. Schenk Heidelberg, 1993, page 156).

SUMMARY OF THE INVENTION

It is an object of the invention to provide a communication system which facilitates the access to a service.

The object is achieved by a communication system comprising a controller arranged for service implementation, which controller is arranged for extracting a service logical program from a data bank after the controller has received parameters transmitted by a terminal unit, and for activating a service in response to a service logical program and second parameters and, in response to a service logical program and first parameters, for providing a service for a subscriber and for transmitting at least one service parameter to the terminal unit and/or, in response to a service logical program and fourth parameters, for deleting a subscriber's authorization to use a service.

In the communication system according to the invention the controller can extract from a data bank a single service logical program for using the service subscribed to and for subscribing to the service and/or for cancelling the service subscribed to, when the controller has received specific parameters. The parameters may be, for example, digits of a telephone number a subscriber has fed to a terminal unit (invocation of a service). There may also exist three separate service logical programs which may be extracted from the data bank, one for subscribing to the service, one for using the service subscribed to and one for cancelling the service subscribed to.

When the controller receives first parameters, a (first) service logical program by which the subscription or providing of the service is effected is extracted from the data bank. The terminal unit is subsequently supplied with at least one service parameter. A service parameter is meant to be understood as a subscriber's number which may be part of the service number. The service number activates a service to which the subscriber has subscribed, and which a subscriber would like to use.

After a second parameter has been received (for example, digits of the service number) a (second) service logical program is extracted from the data bank by the controller, which program activates the service subscribed to. Such a service may, for example, set up a connection to a stored telephone number (personal telephone number).

A service is cancelled with a (fourth) service logical program which is extracted from the data bank by the controller after fourth parameters have been received. In that case the subscriber's authorization to use a service, and thus the subscriber's number, is deleted. A controller can disposition the service subscription and cancellation, or either the subscription or the cancellation.

The measures according to the invention facilitate the access to new services in communication systems. Time-intensive subscription and cancelling procedures cease to exist for the service provider.

Furthermore, the controller may also effect a change of service parameters. The controller is then arranged for changing service parameters in response to a service logical program and transmitted parameters. A (third) service logical program is extracted from the data bank by the controller after a third parameter has been received from a terminal unit. A change of service parameters (for example, personal telephone number) can be effected with that program.

If a service is to be subscribed to, the controller is arranged for extracting the first service logical program after a terminal unit has dialled a service access number, for requesting an identification after a subscriber-specific registration number has been received, and for transmitting the service number, the service change number and the service delete number to the terminal unit after a positive result of an identification check. The digits of the service access number at least partly represent first parameters. The registration number indicates that a subscriber can subscribe to a service of specific service providers. The identification, which is effected, for example, via an identification number (PIN) or a speech sample recognition, shows that the subscriber is authorized to subscribe to services. If the controller detects that the identification has not taken place correctly, a subscription is impossible. After the identification, it would also be possible to make a choice from the services of the service provider.

To activate a service, a subscriber dials a service number whose digits at least partly represent second parameters. After a service number has been dialled, the controller is arranged for extracting the second service logical program used for activating or using a service subscribed to and for implementing the service.

Service parameters are changed by the controller in the following manner: After a terminal unit has dialled a service change number, the controller is arranged for extracting the third service logical program and for requesting the terminal unit to enter an identification number, after a positive result of an identification check, for requesting the terminal unit to enter at least one service parameter about the change to be made, and for storing the modified received service parameters. The digits of the service change number at least partly represent third parameters. A subscriber informs the controller, for example, via the key pad of the terminal unit of the controller, of a new service parameter (for example, new personal telephone number).

A service is cancelled as follows: After a terminal unit has dialled a service delete number, the controller is arranged for extracting the fourth service logical program and for sending the terminal unit an identification request and, after a positive result of the identification check is received, for deleting the subscriber-specific telephone numbers and service parameters necessary for service providing.

The controller is coupled to a data bank and at least one switch. A switch is used for conveying received telephone numbers and/or service parameters to the controller and for receiving control commands from the controller. For example, a switch can establish a connection to a terminal unit after an appropriate control command from the controller.

One or more switches may form part of a communication network which establishes connections between various terminal units and/or other switches in addition to the connections between controller and terminal unit. The controller, the switch and the data bank may also form pan of a service facility coupled to at least one terminal unit via a communication network. The service facility, similarly to a terminal unit, is then coupled to a switch of a communication network.

In a further embodiment of the invention there is a coupling between a switch and a controller and a speech processor arranged for recognizing the speech in a message supplied via a switch, for conveying the message to the controller, for forming a prompt from a message supplied via the controller and for applying said formed prompt to the switch. The speech processor thus recognizes the speech in prompts of a subscriber and converts messages of the controller into prompts.

The invention likewise relates to a controller for service implementation and to a service facility comprising a controller for service implementation, and a switching centre.

DESCRIPTION OF THE PREFERRED EMBODIMENT

Figure 1:
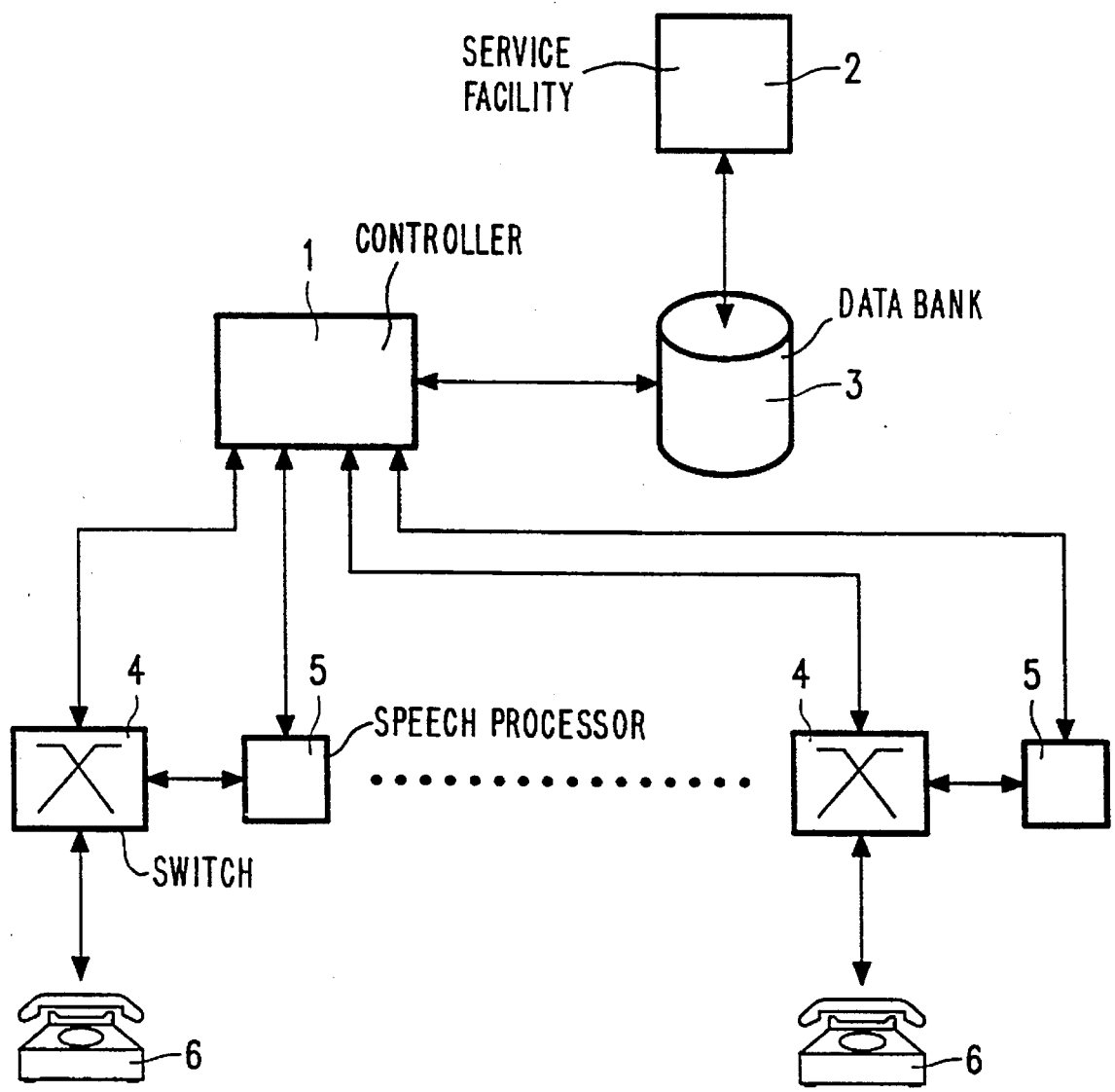
FIG. 1 is a block diagram of a communications system in accordance with the invention.

The communication system shown in FIG. 1 comprises a controller 1 coupled to a service development facility 2, a data bank 3, a plurality of switches 4 and a plurality of speech processors 5. Each speech processor 5 is further connected to an allocated switch 4. The switches 4 form part of a communication network and are coupled either directly or via further switches to terminal units 6. A connection between a switch 4 and the controller 1 is established from a terminal unit 6 by a selection of specific digits of a telephone number. After specific characters (for example digits of a telephone number) have been received, the controller 1 extracts from the data bank 3 a specific service logical program which is subsequently processed. For example, from a specific terminal unit 6 a call may be desired to a specific subscriber whose location and thus whose telephone number changes (personal number service=PN service). This subscriber has informed the controller 1 of the telephone number he can be reached on. This telephone number is stored, for example, in the data bank 3 and is extracted therefrom if a specific service number is dialled by another subscriber via a terminal unit 6. The controller 1 then gives a control command to a switch 4 which sets up the connection to the subscriber who has had his telephone number stored.

The speech processor coupled to a switch 4 is used for speech recognition of prompts of a subscriber via a terminal unit 6 and for converting messages of the controller 1 into a prompt which is supplied via the switch 4 and, as required, further switches, to the terminal unit 6.

The service development facility 2 is used for developing, checking and changing services. New or changed services are fed to the data bank 3 after being processed by the service development facility 2, which data bank stores the new or changed service as a service logical program.

With the communication system shown in FIG. 1, it is possible to additionally subscribe to a service, change service parameters and cancel the service. All further services are implemented by the service logical program which will be explained in the following.

The following service logical program are used to enable the subscription to or providing of a service to the subscriber:

Have the service access number "01599" and the registration number "XXXXXX" been dialled?

Y: Prompt: "Please enter identification number";

Has identification number been entered correctly?

N: Prompt: "Entry was incorrect"

Y: Prompt: "Do you wish to use the PN service?

Enter the digit "1" for yes and "2" for no.";

Has "1" been entered?

N: The service subscription is stopped;

Y: The PN service is provided for the subscriber having registration number "XXXXXX";

Was service providing successful?

N: Prompt: "Impossible to use PN service";

Y: Prompt: "You are a subscriber to the PN service". The service number is: "01500 YYYYYY", the service change number is: '01509 YYYYYY' and the service delete number is: "'01598 YYYYYY'.";

For this and the following service logical programs the personal telephone number service is used as an example, which service establishes the connection to a user (subscriber) who has stored his telephone number as a destination number in the data bank 3. The controller 1 first checks what parameters (telephone number) have been received. The controller 1 is informed of this telephone number by the switch 4. If the service access number '01599' and the registration number ('XXXXXX') have been dialled, the controller 1 sends a control command to a speech processor 5 assigned to the switch 4 that the prompt "Please enter identification number" be entered. Each subscriber is informed of the registration number, for example, via a letter, before a service is used and this registration number enables the subscriber to access specific services or all the services of a service provider. The identification number is a unique number assigned to the subscriber and is considered an authorization to use a service.

If the identification number has not been entered correctly, a control command is sent by the controller 1 to the speech processor 5, carrying the message that the entry was incorrect. Alternatively, the controller 1 sends to the speech processor the message: Do you wish to use the PN service? Enter the digit '1' for yes and '2' for no. If the digit '1' has not been entered, the service subscription is stopped. Alternatively, the PN service is provided for the subscriber. Subsequently, the controller checks whether the service providing was successful. For example, for organizational reasons or because the PN service is already available to the subscriber, a providing of the service might not be possible. If this is the case, a speech processor 5 assists in transmitting the message that the PN service cannot be used. Otherwise, the subscriber is informed of his service number, his service change number and his service cancelling number.

The service logical program will be discussed and explained hereafter for the case where a service subscribed to is used (here, for example, the PN service):
Has the service number '01500 YYYYYY' been dialled?
  Y: Does subscriber's number 'YYYYY' exist?
    N: Prompt: "This number does not exist";
    Y: Connect to the destination number;

The controller 1 detects that the service number ('01500 YYYYY') for the associated service (PN service) has been dialled. Subsequently, a check is made whether such a subscriber's number exists. If this is not the case, the speech processor 5 gives the message that this number does not exist. Otherwise the service is invoked and connected to the destination number stored in the data bank 3. With the first invocation of the service the subscriber's number is entered as a standard value.

The service parameters can be changed with the following service logical program:
Has the service change number '01509 YYYYYY' been dialled?
  Y: Prompt: "Please enter identification number (PIN)";
    Has identification number been entered correctly?
    N: Prompt: "Entry was incorrect";
    Y: Prompt: "Please enter a new destination number";
      Prompt after entry of new destination number: "You have entered the following destination number 'ZZZ'; If entry is correct, enter the digit '1', otherwise the digit '2'";
      Has the digit "1" been entered?
      N: Prompt: "The destination number has not been changed".
      Y: Storage of new destination number; Prompt: "The destination number has been changed".

The service logical program discussed above makes it possible to change a destination number at which a subscriber can be reached. If the service change number ('01509 YYYYYY') has been dialled, the speech processor 5 subsequently indicates in response to a control command from the controller 1 that the identification number be entered. If the identification number has not been entered correctly, the speech processor 5 states that the entry was not correct and then the identification number can be entered again or the service change procedure can be stopped. If the identification number has been entered correctly, a control command from the controller 1 produced by the speech processor 5 states that the new destination number be entered. After the new destination number has been entered, the entered destination number is prompted to the subscriber. Subsequently, the question is posed whether the entry was correct. If the destination number has not been entered correctly, the speech processor 5 issues the prompt that the destination number has not been changed. Otherwise, the destination number is stored in the data bank 3 and the speech processor 5 issues the prompt that the destination number has been changed.

The authorization to subscribe to a service is deleted or a service is cancelled with the aid of the following service logical program:
Has the service delete number '01598 YYYYYY' been dialled?
  Y: Prompt: "Please enter identification number (PIN)";
    Has identification number been entered correctly?
    N: Prompt: "Entry was incorrect";
    Y: Prompt: "Do you wish to cancel the PN service?
      Enter the digit '1' for yes and
      '2' for no";
      Has the digit '1' been entered?
      N: Prompt: "The service cancelling procedure is stopped";
      Y: Prompt: "Please confirm that the PN service having the subscriber's number
        'YYYYY'" has been cancelled;
        Confirmation by subscriber?
        N: Prompt: "PN service has not been cancelled";
        Y: Prompt: "PN service has been cancelled. The destination number has been deleted".

If the service delete number has been dialled, first the speech processor 5 sends out the request to enter the identification number. If the identification number has not been entered correctly, this is announced by the controller 1. Otherwise, there is queried whether the service is to be cancelled. If the service is to be cancelled, the digit '1' and in the other case the digit '2' is to be entered. If the digit '1' has not been entered, the cancelling operation of the service is stopped. Otherwise, a prompt is issued by the speech processor 5 that the subscriber is to confirm the cancellation. If the subscriber has confirmed the cancellation, an appropriate message is sent to him via a prompt. In the other case there is no cancellation.

Figure 2:
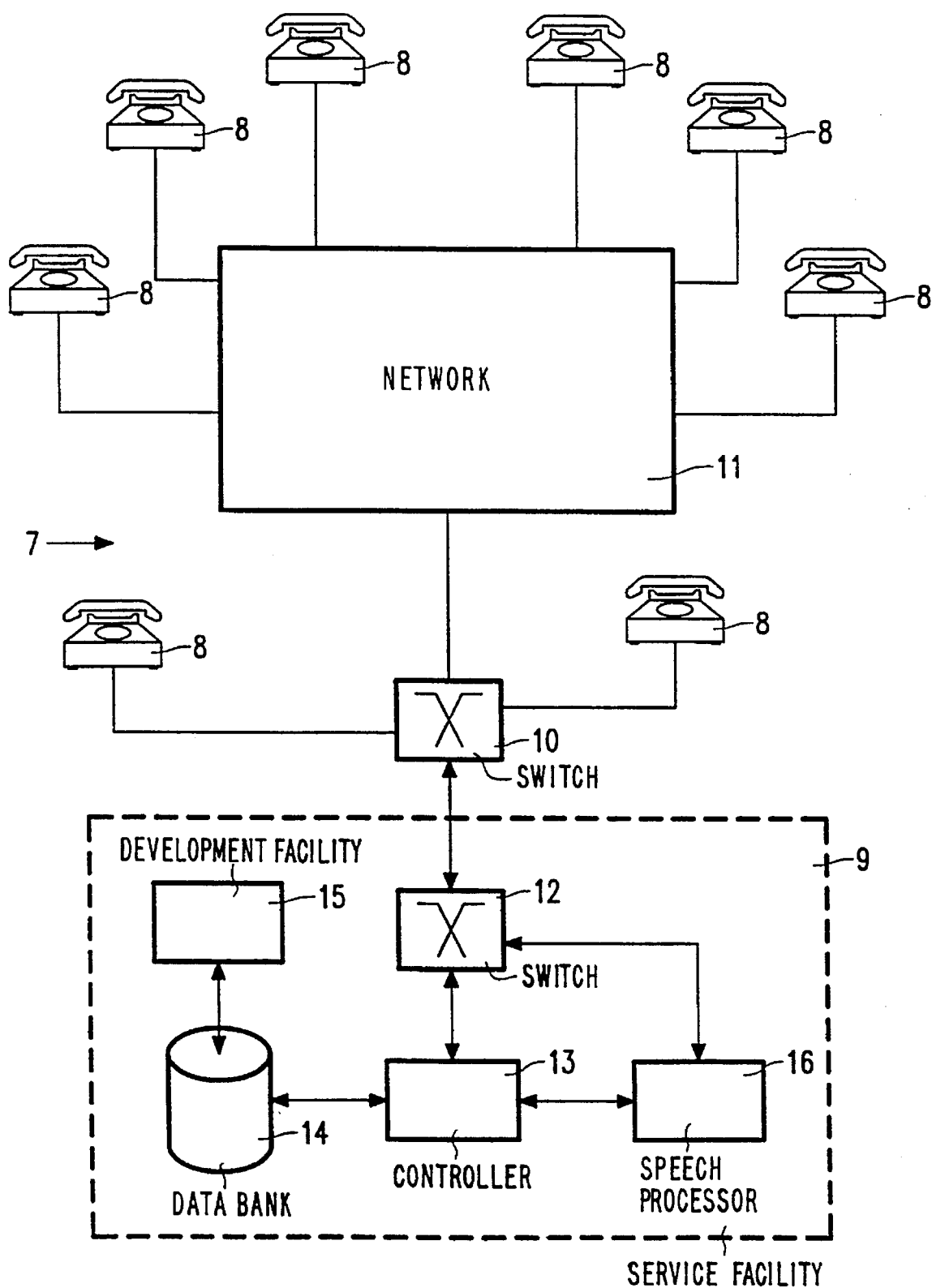
FIG. 2 is a block diagram of a second embodiment of a communications system in accordance with the invention.

In FIG. 2 is shown a further communication system which comprises a communication network 7, a plurality of terminal units 8 and a service facility 9. FIG. 2 shows by way of example a switch 10 of the communication network 7 to which the service facility 9 is coupled. The rest of the communication network 7 shown as a block carries reference numeral 11.

The service facility 9 comprises a switch 12, a controller 13, a data bank 14, a service development facility 15 and a speech processor 16. The switch 12 of the service facility 9 is coupled to the switch 10 of the communication network 7. The switch 12 is further connected to the speech processor 16 and the controller 13. There is also a connection between the controller 13 and the speech processor 16. The data bank 14 in which the service logical program is stored is also connected to the controller 13.

If a connection between a terminal unit 8 and the service facility 9 is to be established, the service facility 9 is to be predialled by the terminal unit 8. For example, a connection to the switch 10 is established by entering the prefixed digits (for example, "0123") in the terminal unit 8 and the connection to the service facility 9 is switched through by entering further dial digits (for example, '67'). For the user to invoke a service in the service facility 9, further dial digits (for example, '999') are to be entered at the terminal unit 8. The switch 12 transfers the received digits to the controller 13 which extracts the service logical program addressed by these digits from the data bank 14. Further characters received from the switch 12 are also transferred to the controller 13. These further characters are interpreted as an entry for the service logical program. The controller 13 then gives a control command to the switch 12 and/or to the speech processor 16 in response to entries processed in the service logical program. For example, the switch 12, upon receiving the control command, is to set up a connection to another terminal unit 8. The speech processor 16 can produce a prompt, for example, after it has received the control command, which prompt is transmitted via the switch 12 to the subscriber who has invoked the service, or can recognize and transfer to the controller 13 prompts which are expected by the calling subscriber.

To the data bank 14 is further connected the service development facility 15 by which a service can be developed, checked and changed. New or changed services are transferred to the dam bank 14 once they have been processed by the service development facility 15, which data bank stores the new or changed service.

We claim:

1. A communication system comprising a terminal unit for providing service to a subscriber, a data bank, and a controller, characterized in that said controller comprises means, responsive to receipt by the controller of a parameter from the terminal unit, for extracting a service logical program from the data bank; and said means for extracting comprises:

means, responsive to said parameter being a first parameter, for providing a service for the subscriber and for transmitting at least one service parameter to the terminal unit, means, responsive to said parameter being a second parameter which does not include said first parameter and which is provided by the terminal unit without prompting by the controller, for activating for the subscriber a service for which the subscriber is authorized, and means, responsive to said parameter being an other parameter which does not include said first parameter or said second parameter and which is provided by the terminal unit without prompting by the controller, for deleting the subscriber's authorization to use said service for which the subscriber is authorized.

2. A communication system as claimed in claim 1, further comprising at least one switch, characterized in that the controller is coupled to the data bank and the switch, and the switch receives control commands from the controller and conveys to the controller at least one of:
   1) telephone numbers, and
   2) service parameters.

3. A communication system as claimed in claim 2, characterized in that the controller, the switch and the data bank form part of a service facility, and the system further comprises a communications network coupling the service facility to the terminal unit.

4. A communication system as claimed in claim 2, characterized in that the system further comprises a speech processor coupled to the switch and the controller, and the speech processor comprises means for:
   1) speech recognition of a message received via the switch,
   2) conveying the message to the controller,
   3) forming a prompt from a message transmitted by the controller, and
   4) applying the formed prompt to the switch.

5. A communication system as claimed in claim 1, characterized in that said service logical program comprises a first logical program, said first parameter is formed by dialling of a service access number by said terminal unit, and the controller further comprises means for:
   1) extracting, responsive to said dialling of a service access number by the terminal unit, the first service logical program,
   2) requesting, responsive to receipt of a subscriber-specific registration number, an identification, and
   3) transmitting, responsive to a positive result of an identification check, the service number, the service change number, and the service delete number to the terminal unit.

6. A communication system as claimed in claim 1, characterized in that:

said service logical program comprises a second logical program, said means for activating includes means for extracting the second service logical program, and said second parameter is formed by dialling of a service number by said terminal unit.

7. A communication system as claimed in claim 1, characterized in that:

said service logical program comprises a third logical program, and said controller comprises means for changing service parameters in response to said third logical service program and a third parameter which does not include said first parameter or said second parameter and which is provided by the terminal unit without prompting by the controller.

8. A communication system as claimed in claim 7, characterized in that said third parameter is formed by dialling of a service change number by said terminal unit, and the controller further comprises means for:
   1) extracting, responsive to the terminal unit dialling a service change number, the third service logical program and requesting an identification,
   2) requesting, responsive to receipt of a positive result of an identification check, a prompt from the terminal unit about intended change of at least one service parameter, and
   3) storing changed received service parameters.

9. A communication system as claimed in claim. 1, characterized in that said service logical program comprises a fourth service logical program, and the controller further comprises means for:
   1) extracting, responsive to dialling of a service delete number by the terminal unit, the fourth service logical program and for requesting an identification, and
   2) deleting, responsive to a positive result of an identification check, subscriber-specific telephone numbers and service parameters necessary for rendering the service available.

10. A communication system as claimed in claim 1, characterized in that said means for extracting, responsive to said parameter being a first, second, third, or fourth parameter respectively formed by dialling of different numbers by the terminal unit, extracts a corresponding first, second, third or fourth service logical program for subscribing to, providing, changing or deleting a service, respectively.

11. A communication system as claimed in claim 1, characterized in that said first, second, third and fourth service logical programs are portions of a single service logical program.

12. A controller for implementing services to a terminal unit, comprising:

means, responsive to receipt by the controller of a parameter from the terminal unit, for extracting a service logical program from the data bank; and said means comprises:

means, responsive to said parameter being a first parameter, for providing a service for the subscriber and for transmitting at least one service parameter to the terminal unit, means, responsive to said parameter being a second parameter which does not include said first parameter and which is provided by the terminal unit without prompting by the controller, for activating for the subscriber a service for which the subscriber is authorized, and means, responsive to said parameter being an other parameter which does not include said first parameter or said second parameter and which is provided by the terminal unit without prompting by the controller, for deleting the subscriber's authorization to use said service for which the subscriber is authorized.

13. A controller as claimed in claim 12, characterized in that said means for extracting, responsive to said parameter being formed by dialling of different numbers by the terminal unit, extracts a corresponding service logical program for at least one of subscribing to, providing, changing or deleting a service, respectively.

14. A service facility comprising a controller for carrying out services, a switch, and means for coupling the controller to the switch for conveying control commands to the controller, the switch being arranged to convey to the controller at least one of 1) received telephone numbers and 2) service parameters, wherein the controller comprises:

means, responsive to receipt by the controller of a parameter from the terminal unit, for extracting a service logical program from the data bank; and said means comprises:

means, responsive to said parameter being a first parameter, for providing a service for the subscriber and for transmitting at least one service parameter to the terminal unit, means, responsive to said parameter being a second parameter which does not include said first parameter and which is provided by the terminal unit without prompting by the controller, for activating for the subscriber a service for which the subscriber is authorized, and means, responsive to said parameter being an other parameter which does not include said first parameter or said second parameter and which is provided by the terminal unit without prompting by the controller, for deleting the subscriber's authorization to use said service for which the subscriber is authorized.

15. A service facility as claimed in claim 14 characterized in that said service logical program comprises a first logical program, said first parameter is formed by dialling of a service access number by said terminal unit, and the controller further comprises means for:

1) extracting, responsive to said dialling of a service access number by the terminal unit, the first service logical program, 2) requesting, responsive to receipt of a subscriber-specific registration number, an identification, and 3) transmitting, responsive to a positive result of an identification check, the service number, the service change number, and the service delete number to the terminal unit.

16. A service facility as claimed in claim 14, characterized in that:

said service logical program comprises a second logical program, said means for activating includes means for extracting the second service logical program, and said second parameter is formed by dialling of a service number by said terminal unit.

17. A service facility as claimed in claim 14, characterized in that:

said service logical program comprises a third logical program, and said controller comprises means for changing service parameters in response to said third logical service program and a third parameter which does not include said first parameter or said second parameter and which is provided by the terminal unit without prompting by the controller.

18. A service facility as claimed in claim 14, characterized in that said third parameter is formed by dialling of a service change number by said terminal unit, and the controller further comprises means for:

1) extracting, responsive to the terminal unit dialling a service change number, the third service logical program and requesting an identification, 2) requesting, responsive to receipt of a positive result of an identification check, a prompt from the terminal unit about intended change of at least one service parameter, and 3) storing changed received service parameters.

19. A service facility as claimed in claim 14, characterized in that said other service logical program is a fourth service logical program, and the controller further comprises means for:

1) extracting, responsive to dialling of a service delete number by the terminal unit, the fourth service logical program and for requesting an identification, and 2) deleting, responsive to a positive result of an identification check, the subscriber-specific telephone numbers and service parameters necessary for rendering the service available.

20. A service facility as claimed in claim 14, characterized in that said means for extracting, responsive to said parameter being one of a plurality of parameters respectively formed by dialling of different numbers by the terminal unit, extracts a corresponding one of a plurality of service logical programs for at least one of subscribing to, providing, changing or deleting a service, respectively.

* * * * *